UNITED STATES PATENT OFFICE.

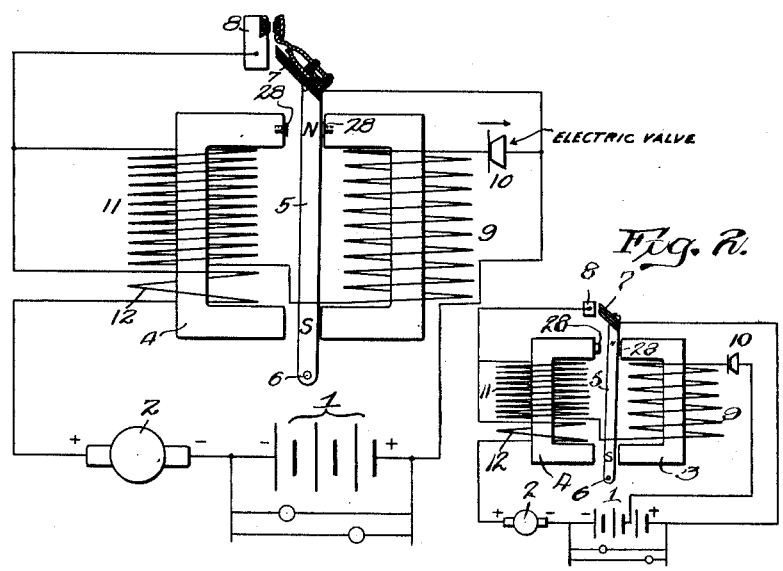

CARL W. EISENMANN, OF NEBRASKA CITY, NEBRASKA.

AUTOMATIC SWITCH.

1,348,098.　　　　Specification of Letters Patent.　　Patented July 27, 1920.

Application filed June 16, 1916. Serial No. 103,996.

*To all whom it may concern:*

Be it known that I, CARL W. EISENMANN, a subject of the Emperor of Germany, residing in Nebraska City, Otoe county, State of Nebraska, have invented Automatic Switches, of which the following is a specification.

One object of my invention is to provide a novel form of switch for automatically governing the connection of a generator to a storage battery, that will open and close at more nearly the battery voltage than has heretofore been possible, and at the same time maintain this adjustment regardless of the voltage of the battery. This, besides reducing sparking at the contacts, renders it practicable to use the same switch, without readjustment, on systems of different voltage, and also if the battery should become discharged down to the voltage of a single cell, this switch would close within a fraction of a volt of, instead of at many times that voltage.

It is further desired to provide an automatic switch whose parts shall be so arranged and connected to a storage battery and a generator that a small current shall be always supplied from the battery to said generator for exciting its field, thereby maintaining a circuit through the commutator and brushes of said generator practically regardless of any insulating material which may accumulate thereon, with a view to insuring that the generator shall produce current at the proper time after it is set in motion.

The invention also contemplates novel means for causing energization of one or more of the windings of the switch with a relatively small current under certain conditions and with a larger current under other conditions, with a view to economizing the battery current.

These objects and other advantageous ends I secure as hereinafter set forth, reference being had to the accompanying drawings, in which, Figure 1 is a diagrammatic view of an automatic switch constructed according to my invention, illustrating the connections between it and its associated apparatus; and Fig. 2 is a diagrammatic view illustrating a special form of my invention.

In the above drawings 1 represents a storage battery and 2 a suitable generator for charging the same; the negative terminals of both battery and generator being permanently connected. The preferred form of automatic controlling switch constituting my invention consists of two U-shaped cores 3 and 4 having their pole pieces adjacent each other but spaced apart for the reception of an armature 5 polarized in any suitable manner. In the case illustrated said armature is formed as a permanent magnet and is pivotally supported in any suitable manner on a pin or spindle 6 at its lower end while its upper end carries a contact 7 placed to coact with a fixed contact 8 when said armature has been drawn as near as possible toward the pole pieces of the core 4.

The positive terminal of the storage battery is directly connected to the main movable switch contact 7 and is likewise connected to one terminal of a coil 9 wound on the core 3, there being an electric valve or rectifier 10 connected in circuit with the coil 9 in such manner as to permit a maximum flow of current in the direction indicated by the arrow and a minimum current flow in the opposite direction.

Other means such as resistance material having a high temperature coefficient may be employed without departing from this invention.

The coil 9 is connected in series with a second coil 11 mounted on the core 4 and connected through a coil 12 to the positive terminal of the generator 2. This second terminal of the coil 11 is likewise connected to the fixed switch contact 8. There is thus a flow of current from the positive terminal of the storage battery through the valve or other current governing device 10 and coils 9, 11 and 12, through the generator 2 to the negative terminal of said battery, but said coils are so wound that as long as the battery voltage is greater than that of the generator, the polarized armature 5 is repelled from the poles of the core 4 and attracted to the poles of the core 3.

When the voltage of the generator rises above that of said battery, current flows from the former through the coils so that the armature 5 is attracted by the poles of the core 4 and repelled by the winding 9 on the core 3, thus causing the movable contact 7 to be moved toward the fixed contact 8, there being a maximum current flow at this time through the coils 11 and 9 owing to the operation of the valve 10. When the switch is closed the coil 12 acts to attract the armature so as to hold the switch closed and the coils 9 and 11 are deënergized.

Current continues to be delivered to the battery until the voltage of the generator falls to such a point as to reverse the current flow in the coil 12 and open the switch, whereupon the coil 12 becomes deënergized except for the small current through the coils 9 and 11 and the coil 9 again attracts the armature 5 and the coil 11 repels it, causing the switch 7—8 to remain open and prevent further charging.

Thereafter while sufficient current flows through the electric valve 10 and the coils to maintain the armature 5 with the movable switch blade in its open position, this flow is relatively small because of the action of said valve, which may have any of the forms well known to the art or which may take the form of a body of resistance having a sufficiently high temperature co-efficient to accomplish similar results. It will thus be seen that the two coils act together to cause movement of the armature in closing the switch and that the main charging current from the generator is operative in holding the armature with the movable switch contact in this closed position, since it flows through the coil 12. This same coil however, acts to repel the armature from the pole piece of the core 4 when the battery voltage becomes higher than that of the generator and the current flow reverses, while the coils 9 and 11 thereafter act to respectively attract and repel said armature and hold it in its open position.

From the foregoing description, it will be noted that the switch opens and closes with a minimum difference between the voltages of battery and generator because at the time of opening the coil 12 is not opposed by any other agency.

In Fig. 2 I have shown the parts arranged as in Fig. 1 except that the electric valve or other current limiting device 10 is connected between one terminal of the coil 9 and the positive terminal of a battery cell other than that constituting the positive terminal of the battery. With such connection the coils 9 and 11 are not deënergized when the switch 7—8 is closed—as would otherwise be the case.

I claim:—

1. The combination of a storage battery; a generator for charging the same; a switch for controlling the connection of the generator and battery; and operating means for said switch consisting of a coil in series with the generator and switch for holding the latter closed when the battery is charging and two other coils independent of said switch and in series with said first coil acting to maintain the switch open when the battery voltage is higher than that of the generator.

2. The combination of a storage battery; a generator for charging the same; a switch for controlling the connection of the generator and battery; and operating means for said switch consisting of three coils in series between one terminal of the generator and the battery terminal of like polarity, said switch being connected in series with one of said coils and shunting the other two.

3. The combination of a storage battery; a generator for charging the same; a switch for controlling the connection of the generator and battery; and operating means for said switch consisting of a coil in series with the generator and switch for holding the latter closed when the battery is charging, and two other coils independent of said switch and in series with said first coil acting to maintain the switch open when the battery voltage is higher than that of the generator, one of said latter coils being wound to attract and the other to simultaneously repel the movable element of the switch.

4. The combination of a storage battery; a generator for charging the same; a switch for controlling the connection of said generator and battery; and operating means for said switch consisting of two coils permanently in circuit between one terminal of the battery and the generator terminal of like polarity and acting to cause closure of the switch when the voltage of the generator rises above that of the battery; with a third coil connected to be energized by the charging current from the generator to the battery and in series with said first two coils.

CARL W. EISENMANN.